May 11, 1965     J. SEDOR ET AL     3,182,876
BURSTING DEVICE FOR MULTILAYER WEBS
Filed Dec. 23, 1963     5 Sheets-Sheet 1

INVENTORS
JOHN SEDOR
CHARLES F. STRUP JR.

BY Richard H. Smith
AGENT

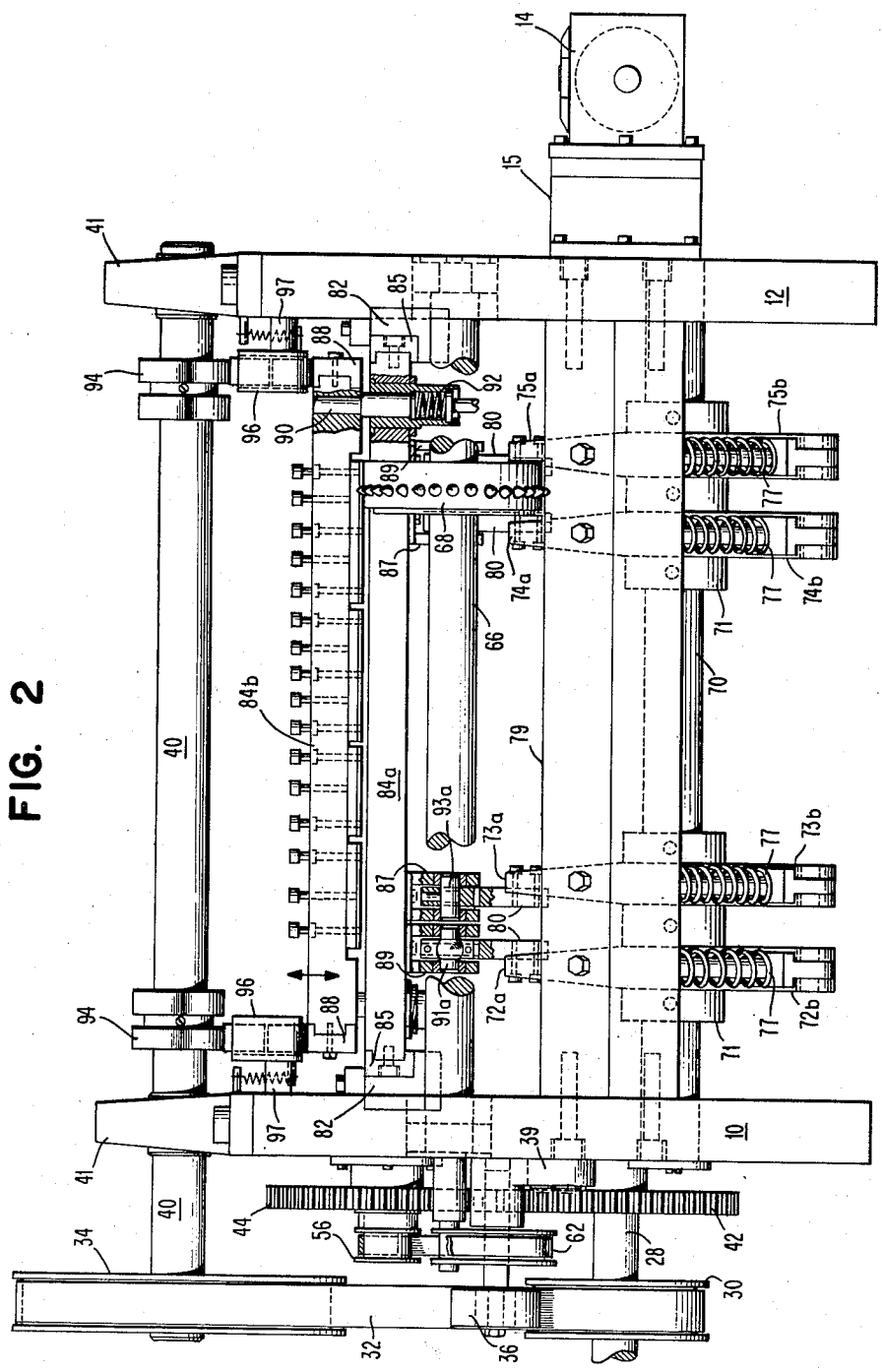

United States Patent Office 3,182,876
Patented May 11, 1965

3,182,876
BURSTING DEVICE FOR MULTILAYER WEBS
John Sedor, Endwell, and Charles F. Strup, Jr., Endicott, N.Y., assignors to International Business Machines Corporation, New York, N.Y., a corporation of New York
Filed Dec. 23, 1963, Ser. No. 332,400
9 Claims. (Cl. 225—101)

The present invention relates to a device for bursting a multilayer web, such as may be formed by a plurality of interconnected business forms, and has particular application to the bursting of a multilayer web which has interspersed within its sheets of carbon paper or other pressure sensitive marking materials.

Print-out devices used in modern data processing systems require high speed form feeding arangements. The best way to supply forms in rapid succession, it has been found, is to join the forms together end-to-end in a long web, which web is fed in a continuous manner into the print-out device. The individual forms in the web are joined together by weakened portions, usually lines of perforations (herein referred to as perforate divisions), which enable convenient separation of the forms after the printing operation is completed.

Many types of machines for automatically separating such forms have been developed and are known to the art as bursting machines. The most widely used type of bursting machine employs a relatively slow speed set of opposed rollers to feed the web of interconnected forms to a pair of opposed, relatively high speed rollers. The sudden pulling force applied by the high speed rollers separates the leading form from the web along the perforate division which had previously joined it to the web. Most bursting machines in use today operate upon one variation or another of this basic bursting action. For example, instead of aligning the two sets of rollers parallel with one another, the high-speed rollers may be angled slightly in relation to the low speed rollers. The bursting force, instead of being applied to all portions of a perforate division at the same instant, is swept along the division in a manner which causes the tear to progress from one side of the web to the other. The same effect can be achieved by placing the rollers in a parallel relationship and equipping the high speed rollers with a pair of matching helical gripping elements. While progressive tearing of the perforate divisions requires slightly more time than instantaneous tearing, the total bursting force required is considerably reduced.

Another variation of this basic bursting action calls for the web of forms to be pulled between a pair of reciprocating clamping bars by a set of continuously operating feed rollers. Each time a perforate division is drawn into the space between the clamping bars and the rollers the bars are forced together to clamp the web, causing the rollers to separate the leading form from the web with a tearing action identical to that effected by the above-discused high speed-low speed roller type machine.

The basic action of all these types of bursting machines is characterized by a sudden application, through one or more web handling elements having velocities widely differing from that of the web, of tangential surface forces to either side of a perforate division in the web, resulting in either an instantaneous or progressive tearing of the division.

While this type of bursting action has been found to be adequately suited to the bursting of single layer webs, the use of such an action in bursting multilayer webs, particularly those having layers of carbon paper or other pressure sensitive marking materials interspersed between the layers, creates several problems. A first of these problems is brought about by the laminar nature of the multilayer web. When sudden tangential bursting forces are applied to the web in the manner taught by the prior art, slight relative motion is set up between the several adjacent web layers, rubbing them together and causing smudging of the printing thereon. Often, the presence of carbon paper within the web gives rise to highly undesirable streaks and blackened areas. Also, such a bursting action tends to seprarate the outer layers of the web while leaving the middle layers still attached.

Another difficulty is caused by the use of rollers or other types of small area contact members as the elements for applying the bursting force. Small area web handling elements localize and thus concentrate the forces on the web, causing spurious carbon or ink transfer when carbon paper or the like is present between the web layers. Even further force localization results when the bursting force is swept along a perforate division, such as is done by prior art devices to achieve a tearing action which minimizes the total bursting force. While force reduction is a must in the bursting of multi-thickness webs, there is a need for a device which will apply the force uniformly over a relatively large area of the web so that spurious carbon and ink transfer cannot occur.

It is therefore an object of the present invention to provide an improved bursting device for multilayer webs.

Another object is to provide an improved web bursting device that does not apply sudden, tangential surface forces to the web.

Still another object is to provide a web bursting device which is capable of handling multilayer webs containing sheets of carbon paper or the like without causing spurious ink transfer between the web layers.

Yet another further object is to provide a bursting device for multilayer webs which device requires only a minimum total bursting force, and which transmits the force to the web uniformly over a relatively large area of the web surface.

In accordance with the present invention, bursting of a multilayer web is accomplished by means which assure a firm gripping of the web prior to the application thereto of any sudden bursting forces. Further, bursting forces are applied to the web through relatively large area, flat gripping bars which distribute their clamping pressure over the full width of the web. Means operating upon the gripping bars cause the bursting of perforate divisions in the web by the application thereto through the gripping bars of either a progressive tensing force or a sudden shearing force. The web is thus handled throughout the bursting operation without relative motion between the web and the various elements of the bursting device or between the various layers of the web itself.

The foregoing and other objects, features, and advantages of the invention will be apparent from the following more particular description of a preferred embodiment of the invention, as illustrated in the accompanying drawings.

In the drawings:

FIG. 2 is a front elevation view, partially broken away, of the embodiment of FIG. 1.

Detailed description

Figure 1:
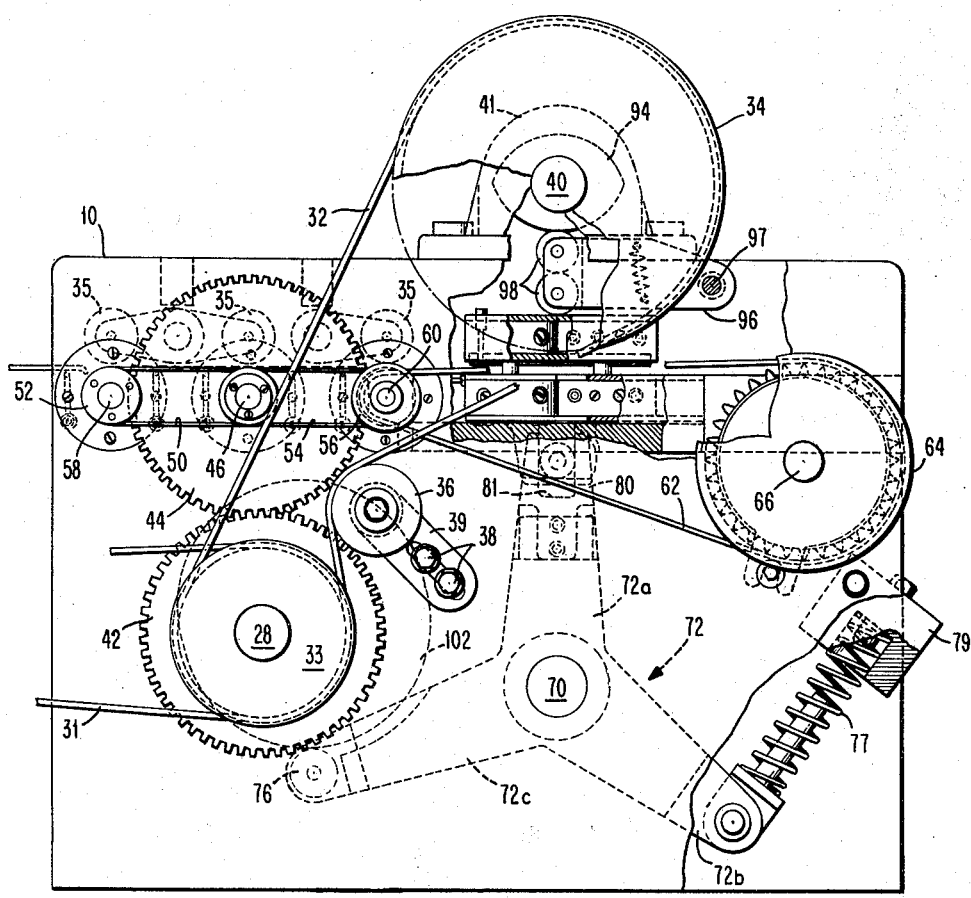
FIG. 1 is a side elevation view, partly broken away, of a preferred embodiment of the present invention.
Figure 3:
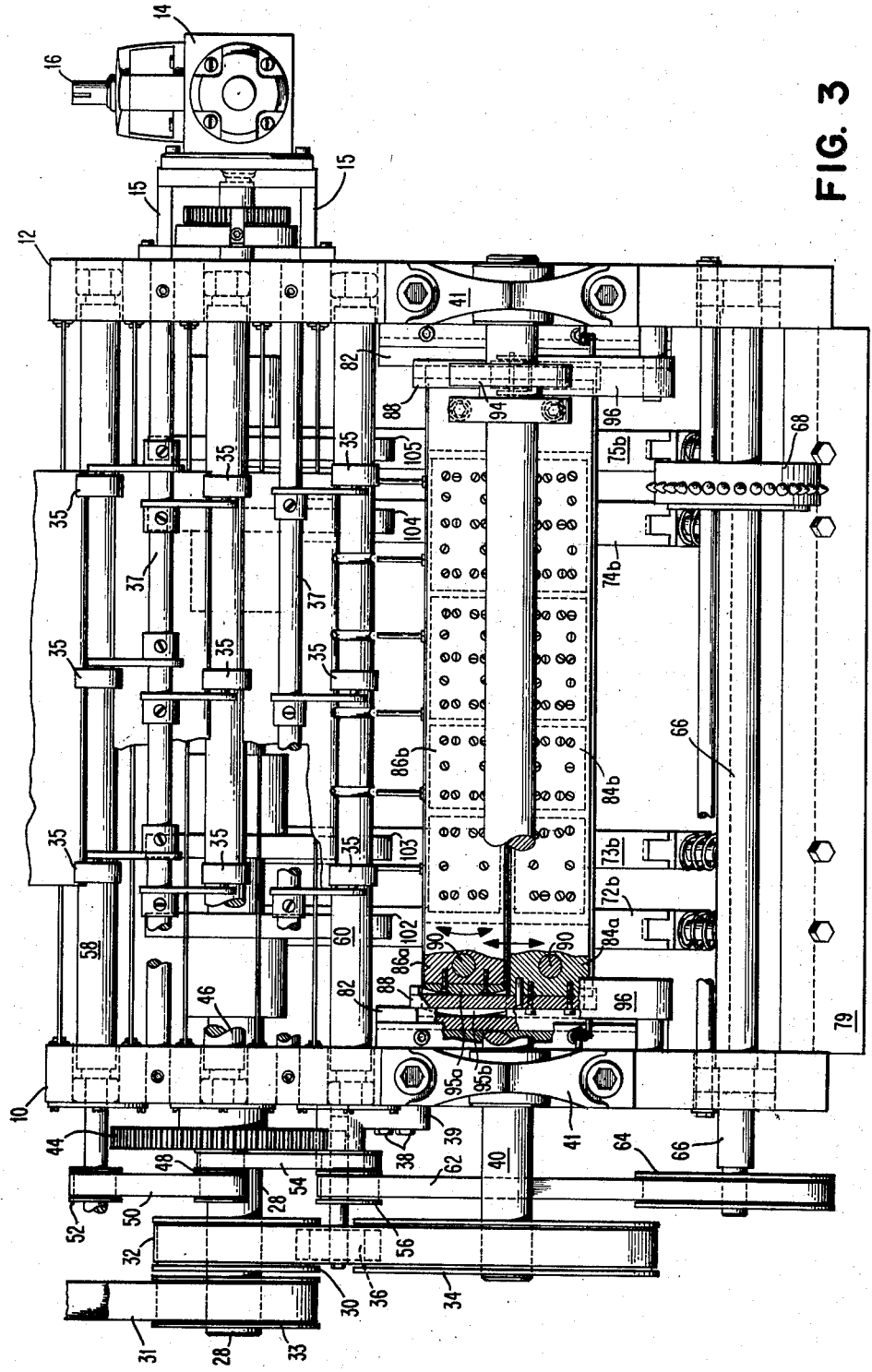
FIG. 3 is a plan view, partially broken away, of the embodiment of FIGS. 1 and 2.

With reference to FIGS. 1, 2, and 3, a detailed description of a preferred embodiment of the invention will hereinafter be given. The basic frame of the machine includes a pair of side support members 10 and 12 rigidly separated by a pair of crossbraces 70 and 79. Rotary drive power is provided from an external drive source (not shown) through a shaft 16 and from there is transmitted, through a right-angle gear box 14, to an input shaft 28 which is journaled in the side supports 10 and 12. On the end of the shaft 28 away from right-angle gear box 14 are keyed a spur gear 42 and two pulleys 30 and 33.

A second spur gear 44 engages the spur gear 42 and is keyed to a shaft 46, turning it in a one-to-one relationship with shaft 28. The shaft 46, extending between the side supports 10 and 12 and journaled therein, is one of the feed rolls used to transport separated documents away from the bursting mechanism. Companion feed rolls 58 and 60 are fitted at their left hand ends (FIG. 3) with pulleys 52 and 56, respectively. The pulleys 52 and 56 are driven through a pair of belts 50 and 54 by a double groove pulley 48 which is keyed to the left hand end of center roller shaft 46. A plurality of pressure wheels 35 are suspended from a pair of cross supports 37 in positions immediately above the three roller shafts 46, 58, and 60 and serve to maintain a driving contact between the roller shafts and the bursted documents being transported thereby.

The pulley 56, on roller shaft 60 drives, through a belt 62 and a pulley 64, a shaft 66. The shaft 66 is journaled in the side supports 10 and 12 and has attached to it a document drive sprocket 68. The teeth of the sprocket 68 are adapted to engage the holes in an edge of the multilayer web to be burst, thus feeding the web in a continuous manner into the bursting mechanism.

The pulley 30 on the main drive shaft 28 engages a belt 32 which in turn engages and drives a pulley 34. The latter pulley is keyed to the left hand end of a shaft 40 which is supported in a pair of journal blocks 41 mounted on the top surfaces of side supports 10 and 12. An idler wheel 36 is rotatably mounted on a bracket 39 which is adjustably bolted to side support 10 by means of a pair of bolts 38. In use, the idler wheel 36 takes up the slack of belt 32 in order to maintain a proper frictional engagement between the belt and the pulleys 30 and 34. By loosening the bolts 38, and sliding the bracket 39 downward, the pulley 34 is removed from its driven relationship with the pulley 30. This permits adjustment of the rotational relationship between the shafts 28 and 40 and also allows for belt removal and replacement, when necessary.

The pulley 33, which is shown mounted at the extreme left hand end of the input shaft 28 (FIG. 3) and its associated belt 31 serve as power take-off means for supplying drive power to a document stacking device (not shown) associated with the present invention, but not pertinent to an understanding thereof.

Figure 4:
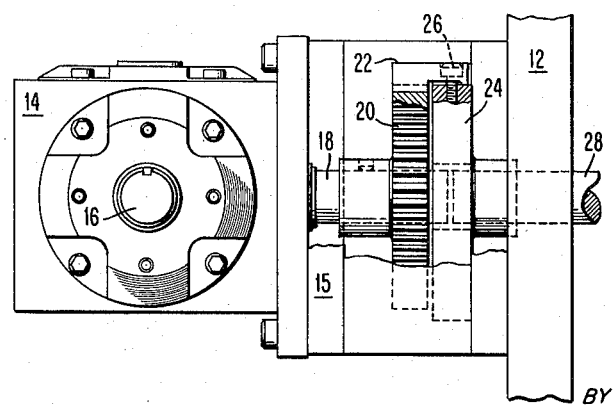
FIG. 4 is a side elevation view of a disengageable drive link connecting the machine of the present invention with a main drive source.

As previously mentioned, the drive input to the machine of the present embodiment is at a shaft 16 (FIG. 3). The shaft 16 may be connected to a main drive source which serves as a common power supply for other document handling machines (e.g., a print-out apparatus) besides the bursting machine herein described. Since there are times when it is desirable to stop the bursting machine while the main drive source continues to drive one or more of the other machines, there is a need for a device which will quickly and simply disconnect the main input shaft 28 from the power supply shaft 16. Such a device is shown between the support brackets 15 (FIG. 3) and will hereinafter be described in detail with reference to FIG. 4.

Referring to that figure, a disc 24 is shown mounted on the end of input shaft 28. The right-angle gear box 14 has an output shaft 18 coaxial with the shaft 28. A spur gear 20 is mounted on the shaft 18 in juxtaposition to the disc 24. The shaft 18 and its attached spur gear 20 are free to rotate independently of the shaft 28 and its attached disc 24. A drive connection between the shafts is established by a dog link 22 which is bolted by a bolt 26 to the periphery of the disc 24. The left end of the dog link is adapted to fit between any two adjacent teeth of the spur gear 20. The transmission of driving power to the bursting machine may thus be cut off simply by removing the dog link 22.

Bursting mechanism

Figure 5:
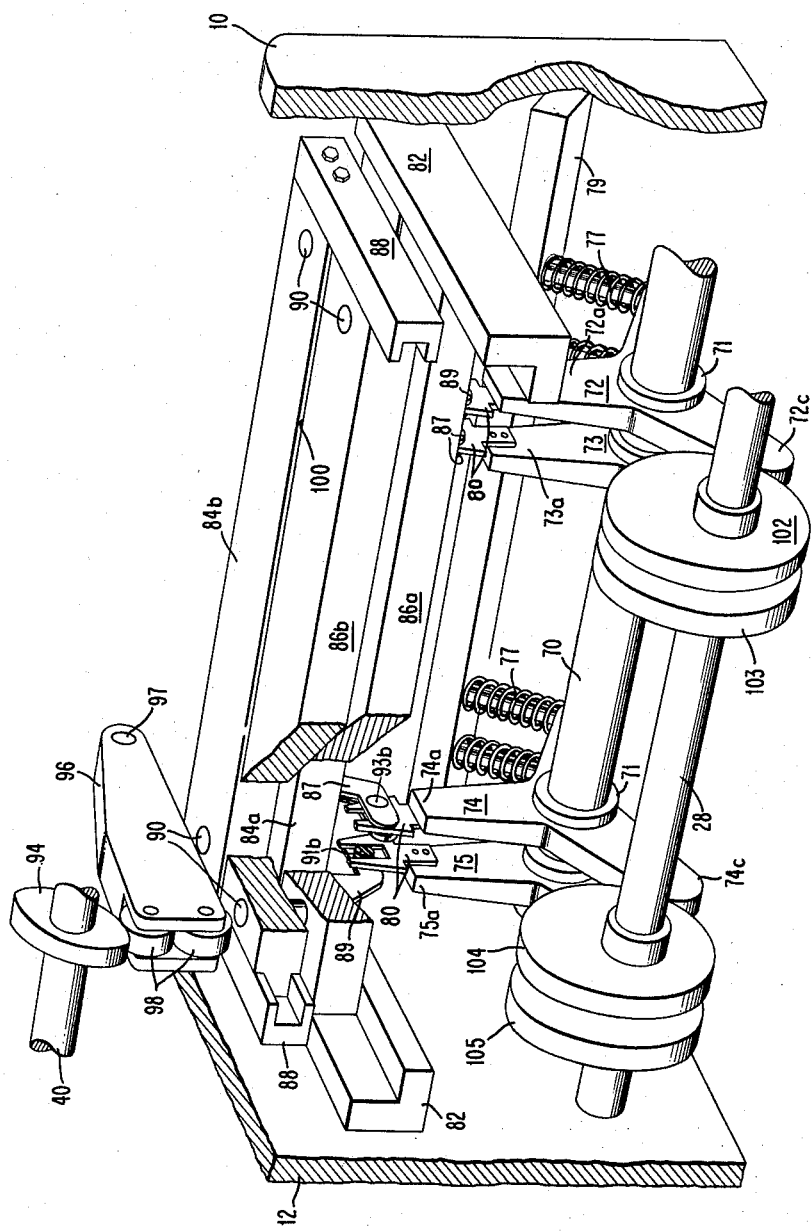
FIG. 5 is a perspective view of the basic elements of the web bursting mechanism of the embodiment shown in FIGS. 1–3.

A detailed description of the web bursting mechanism of the present invention will hereinafter be given with continued reference to FIGS. 1–3 and with additional reference to FIG. 5. FIG. 5 is a perspective view of the embodiment illustrated in FIGS. 1–3, and is cut away so as to show only the elements forming a direct part of the bursting mechanism per se.

The elements which apply the bursting force to the web are two pairs of opposed, horizontally slidable clamping bars 84a, 84b and 86a, 86b. The bars 84a and 84b are connected together by a pair of spring loaded guide posts 90 (FIG. 2) and are permitted thereby to move vertically but not horizontally with respect to each other. The bars are normally held away from one another by the vertical bias force of a compression spring 92 located beneath each of the guide posts 90. The second pair of clamping bars 86a, 86b are connected together in exactly the same fashion.

The lower bars 84a and 86a are supported by, and are adapted to slide upon, a pair of L-rails 82, bolted to the inner walls of side supports 10 and 12. No positive connection exists between the two sets of clamping bars 84a, 84b and 86a, 86b and each set slides on the rails 82 independently of the other. A pair of C-rails 88 are bolted to the ends of the upper clamping bar 84b. The ends of upper clamping bar 86b are fitted to slide in the horizontal grooves of the C-rails 88.

A pair of cam follower arms 96 (only one of which is shown in FIG. 5), are mounted above the clamping bars and are pivotably attached to the side supports 10 and 12 by the lugs 97. The lower of a pair of rollers 98 in each of the follower arms 96 rolls on the top surface of one of the C-rails 88. A pair of plate cams 94 mounted on the shaft 40 periodically force the follower arms 96 downward, thus causing a simultaneous closing of both sets of clamping bars. It is to be noted that even when clamping forces are being applied by followers 96, the two sets of clamping bars 84a, 84b and 86a, 86b are still permitted to slide independently of one another on the guide rails 82.

The clamping bars are horizontally reciprocated to perform the bursting operation by four plate cams 102, 103, 104, and 105 mounted on the input shaft 28. Four three-armed rocker elements 72, 73, 74, and 75 are pivotably mounted on the cylindrical crossbar 70 and are laterally spaced thereon by a series of fixed collars 71 so as to be in alignment with the four plate cams 102–105. Each of the arms 72c, 73c, 74c, and 75c of the four rocker elements 72, 73, 74, and 75, respectively, has a roller follower 76 (see FIG. 1) on its outer end. These followers are biased against the cam surfaces of the plate cams 102–105 by the compression springs 77 mounted between the crossbar 79 and the arms 72b, 73b, 74b, and 75b of the rocker elements. Each of the arms 72a, 73a, 74a, and 75a has a slotted bracket 80 projecting from its upper end. The surfaces of the slot 81 (FIG. 1) in each of these brackets engages one of four drive pins connected to the lower clamping bars 84a and 86a.

The drive pins 93a and 93b (FIGS. 2 and 5) are contained in a pair of bifurcated brackets 87 attached to the underside of clamping bar 84a. The pins 91a and 91b are connected by a pair of similar brackets 89 to the underside of clamping bar 86a. As the rocker elements 72–75 are oscillated under the influence of the plate cams 102–105 and the springs 77, the inner surfaces of the slots 81 in the brackets 80 act against the respective pins 91a, 91b, 93a, and 93b to produce a horizontal reciprocation of the clamping bars. The set 86a, 86b are reciprocated by the outer cams 102 and 105 while the set 84a, 84b reciprocate under the influence of the inner cams 103 and 104.

Operation

Figure 6:
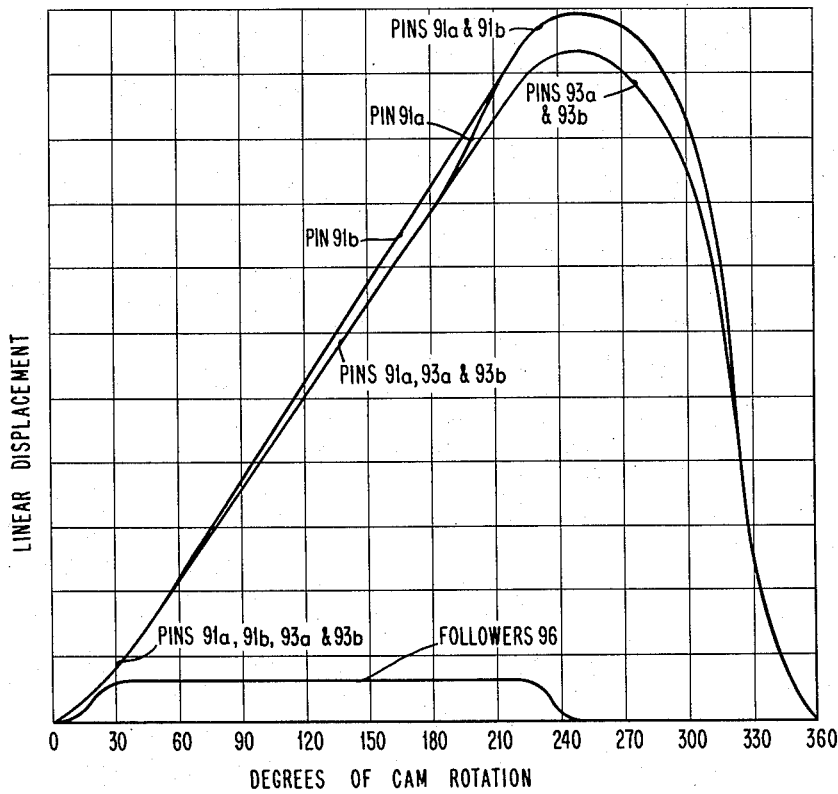
FIG. 6 is a cam follower diagram illustrating the sequence of movement of the clamping bars of the bursting mechanism of the preferred embodiment during a single bursting cycle.

With continued reference to FIGS. 1–3 and 5 and with additional reference to FIG. 6, the operation of a bursting cycle of the above-described preferred embodiment will now be given. In reading the cam follower diagram of FIG. 6, it will be kept in mind that the motion of the motion of the pin 91a is generated by cam 102, that of pin 91b by cam 105, that of pin 93a by cam 103, that of pin 93b by cam 104 and that of the followers 96 by the two identical cams 94. The horizontal motion of the clamps 84a, 84b is defined by the motion of pins 93a and 93b while the horizontal motion of the clamps 86a, 86b is defined by the motion of pins 91a and 91b.

The multilayer web to be burst is fed first between the clamping bars 84a, 84b, and then between the clamping bars 86a, 86b by the continually rotating sprocket wheel 68. As the plate cams 102–105 pass through a predetermined starting point (defined as zero degrees of rotation in FIG. 6) the two sets of clamping bars begin to move in the same direction as the moving web, accelerating to web speed after approximately 34° of cam rotation. At this point the followers 96 force down the upper clamping bars 84b and 86b to firmly grip the web. It is to be noted that no clamping pressure is applied to the web until the clamping bars are traveling at substantially the same speed as the web.

The rotation of cams 102–105 is synchronized with the rotation of feed sprocket 68 so that when the clamping bars are closed upon the web, the perforate division to be torn is centered in the vertical gap 100 between the two sets of bars. After the clamping pressure is fully applied to the web, the pin 91b increases its velocity while the remaining three pins continue moving at the velocity of the web. This causes the set of bars 86a, 86b to begin pivoting about a vertical axis through the pin 91a (FIG. 2). Such a pivotal movement is permissible since both ends of the bars 86a and 86b are fitted with a pair of arcuate end plates 95a and 95b (FIG. 3). Also, the pins 91a and 91b (FIG. 2) have spherical center portions so that the pins are free to rotate a moderate amount within the slots 81 and the brackets 80. The skewing of the clamping bars 86a, 86b with respect to the bars 84a, 86b causes a progressive, side-to-side tearing of the perforate division.

After approximately 180° of cam rotation, the division is completely torn and the pin 91a accelerates to match the velocity of pin 91b. This assures complete separation of the severed portion of the web and additionally squares it up for presentation to roller shaft 60, which removes it from between the clamping bars. As is shown in FIG. 6, removal of the clamping pressure from the clamping bars is begun just prior to the termination of the forward stroke of the bars. Thus, at the end of the forward stroke, when the severed stack of documents is presented to the roller shaft 60, the web is completely released and the sheets are free to be removed from between the bars without danger of tearing.

The coaction of cams 102–105 and springs 77 thereafter reverse the direction of movement of the two sets of clamping bars, moving them into position on either side of the next perforate division in the web, whereupon a new cycle is begun. Each bursting cycle results in the separation from the web of the leading layer of forms. The forms thus separated are transported by the feed rollers 60, 46, and 58 to an external stacking device (not shown).

The bursting action of the present invention, as just described in connection with the preferred embodiment, is one in which a progressive tearing of the perforate division to be burst is effected by two sets of relatively large area clamping bars 84a, 84b and 86a, 86b. The clamping bars are caused to firmly grip the multilayer web while traveling at web speed and before any bursting forces are applied. The web therefore does not receive sudden tangential surface forces and relative motion between adjacent web layers is eliminated. The bursting action, therefore, cannot cause smudging of characters printed on the web layers or smearing of the ink on carbon paper or the like which may be interspersed between web layers. Further, the relatively large contact area of the clamping bars, which extend over the full width of the web, assures wide and even distribution of all forces applied to the web. This eliminates the problem of spurious ink transfer caused by excessive localization of forces applied to the web.

The progressive, side-to-side tearing action produced by the skewing of clamping bars 86a, 86b in relation to bars 84a, 84b is one which minimizes the total bursting force. Other desirable types of bursting actions may also be applied by the apparatus of the present invention. For example, instead of skewing or pivoting the clamping bars 86a, 86b to produce a progressive tensing of the perforate division, those bars may be given sudden vertical movement so that the perforate division is burst with a shearing action rather than a pulling or tensing action. The same effect can be produced by the application to the bars 86a, 86b of a sudden cross-wise or lateral movement, parallel to the bars 84a, 84b. Progressive shearing of the perforate division may be accomplished by imparting to the bars 86a, 86b a pivotal movement about an axis parallel to the direction of web travel.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a device for bursting a continuously moving multilayer web of perforately divided sheets, the combination comprising:
   first and second sets of opposed clamping jaws, each said set being of a width at least equal to the width of said web;
   means for continuously feeding said web between the jaws of both said sets;
   means for positioning said sets of jaws on opposite sides of a perforate division in said web;
   means for moving said sets of jaws, so positioned, at the speed of said web;
   means for imparting an additional, sudden movement to said first set of jaws;
   means for closing said jaws to clamp said web just prior to the occurrence of said sudden movement, substantially uniformly distributed clamping pressure being thus applied by said jaws across the fuel width of said web, and for opening said jaws subsequent to the occurrence of said sudden movement, said sudden movement effecting a simultaneous tearing of each layer of said moving web along said division.

2. In a device for bursting a continuously moving multilayer web of perforately divided sheets, the combination comprising:
   first and second sets of opposed clamping jaws, each said set being of a width at least equal to the width of said web;
   means for continuously feeding said web between the jaws of both said sets;

means for positioning said two sets of jaws on opposite sides of a perforate division in said web;

means for moving said sets of jaws, so positioned, at the speed of said web;

means for imparting an additional, slight pivotal movement to said first set of jaws; and means for closing said jaws to clamp said web just prior to the occurrence of said pivotal movement, substantially uniformly distributed clamping pressure being thus applied by said jaws across the full width of said web, and for opening said jaws subsequent to the occurrence of said pivotal movement, said pivotal movement effecting a progressive, side-to-side tearing of each layer of said moving web along said division.

3. In a device for bursting a continuously moving multilayer web of perforately divided sheets, the combination comprising:

first and second sets of opposed clamping jaws, each said set being of a width at least equal to the width of said web;

means for continuously feeding said web between the jaws of both said sets;

means for alternately moving said sets of jaws in a first and a second direction, said directions being, respectively, with and against the direction of travel of said web, said sets of jaws, at the outset of each said period of movement in said first direction, being positioned on opposite sides of a perforate division in said web while moving at the speed of said web;

means for imparting an additional, sudden movement to said first set of jaws during a medial portion of each said period of movement in said first direction;

means for closing said jaws to clamp said web just prior to the occurrence of said sudden movement, substantially uniformly distributed clamping pressure being thus applied by said jaws across the full width of said web, and for opening said jaws subsequent to the occurrence of said sudden movement, said sudden movement effecting a simultaneous tearing of each layer of said moving web along said division; and means for removing said torn-off portion of said web from said first set of jaws at the completion of each said period of movement in said first direction.

4. In a device for bursting a continuously moving multilayer web of perforately divided sheets, the combination comprising:

first and second sets of opposed jaws, each said set being of a width at least equal to the width of said web;

means for continuously feeding said web between the jaws of both of said sets;

means for alternately moving said sets of jaws in a first and a second direction, said directions being, respectively, with and against the direction of travel of said web, said sets of jaws, at the outset of each said period of movement in said first direction, being positioned on opposite sides of a perforate division in said web while moving at the speed of said web;

means for imparting an additional, slight pivotal movement to said first set of jaws during a medial portion of each said period of movement in said first direction;

means for closing said jaws to clamp said web just prior to the occurrence of said pivotal movement, substantially uniformly distributed clamping pressure being thus applied by said jaws across the full width of said web, and for opening said jaws subsequent to the occurrence of said pivotal movement, said pivotal movement effecting a progressive, side-to-side tearing of each layer of said moving web along said division; and means for removing said torn-off portion of said web from said first set of jaws at the completion of each said period of movement in said first direction.

5. The multilayer web bursting device as set forth in claim 1 with the addition of removal means operative to engage the torn-off portion of said web to remove it from said jaws, said removal means contacting said torn-off portion only after said portion has been separated from said web.

6. The multilayer web bursting device as set forth in claim 2 with the addition of removal means operative to engage the torn-off portion of said web to remove it from said jaws, said removal means contacting said torn-off portion only after said portion has been separated from said web.

7. In a device for bursting a multilayer web of perforately divided sheets, the combination comprising:

first and second sets of closeable jaws having a width at least equal to the width of said web;

means for feeding said web between the jaws of both said sets of jaws;

means for closing said jaws to clamp said web on both sides of a perforate division therein;

means for forcing said first set of jaws away from said second set of jaws with a first pivotal movement to effect a side-to-side tearing of each layer of said web along said division, thereby tearing off a portion of said web;

removal means operative to engage said torn-off portion of said web to remove it from said jaws, said removal means contacting said torn-off portion only after said portion has been separated from said web; and realigning means for imparting a second pivotal movement, to said first set of jaws after the completion of said tearing and before said torn-off portion is engaged by said removal means, whereby said portion is presented to said removal means in alignment with the remainder of said web.

8. The multilayer web bursting device as set forth in claim 7 with the addition of means to cause said sets of closeable jaws to move at the speed of said web prior to closing said jaws to clamp said web on both sides of a perforate division.

9. In a device for bursting a multilayer web of perforately divided sheets, the combination comprising:

first and second sets of closeable jaws having a width at least equal to the width of said web;

means for feeding said web between the jaws of both said sets of jaws;

means for closing said jaws to clamp said web on both sides of a perforate division therein;

means for forcing said first set of jaws away from said second set of jaws with a first pivotal movement to effect a partial side-to-side tearing of each layer of said web along said division;

means for forcing said second set of jaws away from said first set of jaws with a second pivotal movement to complete the side-to-side tearing of each said layer of said web along said division;

removal means operative to engage said torn-off portion of said web to remove it from said jaws, said removal means contacting said torn-off portion only after said portion has been separated from said web.

References Cited by the Examiner
UNITED STATES PATENTS

| | | | |
|---|---|---|---|
| 1,688,157 | 10/28 | Sherman | 225—101 |
| 2,171,769 | 9/39 | Stolar et al. | 225—100 XR |
| 2,600,042 | 6/52 | Wright | 225—101 |

References Cited by the Applicant
UNITED STATES PATENTS

| | | |
|---|---|---|
| 1,767,784 | 6/30 | Cooke. |
| 2,246,228 | 6/41 | Winter. |
| 2,355,690 | 8/44 | Zent. |
| 2,600,042 | 6/52 | Wright. |

ANDREW R. JUHASZ, *Primary Examiner.*

UNITED STATES PATENT OFFICE
CERTIFICATE OF CORRECTION

Patent No. 3,182,876　　　　　　　　　　　　　　May 11, 1965

John Sedor et al.

It is hereby certified that error appears in the above numbered patent requiring correction and that the said Letters Patent should read as corrected below.

Column 2, line 33, for "another" read -- a --; line 41, for "suddent" read -- sudden --; column 5, line 17, strike out "motion of the"; line 51, for "and" read -- of --; line 52, for "86b", second occurrence, read -- 84b --; column 6, line 62, for "fuel" read -- full --.

Signed and sealed this 15th day of February 1966.

EAL)

ttest:

RNEST W. SWIDER
testing Officer

EDWARD J. BRENNER
Commissioner of Patents